United States Patent [19]
Aaltonen et al.

[11] Patent Number: 5,624,558
[45] Date of Patent: Apr. 29, 1997

[54] METHOD AND APPARATUS FOR SCREENING A FIBER SUSPENSION

[75] Inventors: Frank Aaltonen, Lisse, Netherlands; Frey Frejborg, Queensbury, N.Y.

[73] Assignee: CAE ScreenPlates Inc., Pruyn's Island, N.Y.

[21] Appl. No.: 286,440

[22] Filed: Aug. 4, 1994

[51] Int. Cl.⁶ .................. B07B 1/20; B07B 1/46; B01D 29/64
[52] U.S. Cl. .................. 210/415; 210/497.1; 209/250; 209/273; 209/306
[58] Field of Search .................. 162/55, 251; 210/413, 210/414, 415, 497.01; 209/306, 273, 250

[56] References Cited

U.S. PATENT DOCUMENTS

| | | |
|---|---|---|
| 492,039 | 2/1893 | Meurer . |
| 1,467,759 | 9/1923 | Hall . |
| 1,928,216 | 9/1933 | Apel . |
| 2,301,514 | 11/1942 | Brewster . |
| 2,827,169 | 3/1958 | Cusi . |
| 3,363,759 | 1/1968 | Clarke-Pounder . |
| 3,394,809 | 7/1968 | Hunter . |
| 3,420,373 | 1/1969 | Hunter . |
| 3,535,203 | 10/1970 | Nilsson . |
| 3,617,008 | 11/1971 | Lamort . |
| 3,713,541 | 1/1973 | Nelson . |
| 3,726,401 | 4/1973 | Bolton . |
| 3,909,400 | 9/1975 | Seifert . |
| 4,155,841 | 5/1979 | Chupka . |
| 4,200,537 | 4/1980 | Lamort . |
| 4,267,035 | 5/1981 | Martin . |
| 4,410,424 | 10/1983 | Chupka . |
| 4,529,520 | 7/1985 | Lampenius . |
| 4,676,903 | 6/1987 | Lampenius . |
| 4,680,108 | 7/1987 | Ahs . |
| 4,749,474 | 6/1988 | Young . |
| 4,776,957 | 10/1988 | Lampenius et al. . |
| 4,795,560 | 1/1989 | Chupka . |
| 4,836,915 | 6/1989 | Frejborg . |
| 4,880,540 | 11/1989 | Frejborg . |
| 4,954,249 | 9/1990 | Gero et al. . |
| 4,986,900 | 1/1991 | Mason . |
| 5,000,842 | 3/1991 | Ljokkoi . |
| 5,023,986 | 6/1991 | Gero et al. . |
| 5,041,214 | 8/1991 | Gero . |
| 5,073,254 | 12/1991 | Beisenherz et al. . |
| 5,172,813 | 12/1992 | Ljokkoi . |

FOREIGN PATENT DOCUMENTS

| | | |
|---|---|---|
| 68403 | 2/1994 | China . |
| 2516563 | 11/1981 | France . |
| 1157200 | 11/1963 | Germany . |
| 3013941A1 | 10/1981 | Germany . |
| 2-264092 | 10/1990 | Japan . |
| 82/00007 | 1/1982 | WIPO . |

*Primary Examiner*—Thomas M. Lithgow
*Attorney, Agent, or Firm*—Nixon & Vanderhye P.C.

[57] ABSTRACT

The differences in performance of a screening cylinder during screening of a fiber suspension (e.g. low consistency paper pulp) at the inlet end compared to the reject end is accommodated by constructing the feed side surface of the screening cylinder so that it induces greater turbulence in the vicinity of the screen cylinder surface adjacent the reject end of the screen than adjacent the inlet end. Typically this increase in turbulence is at least about 10% (preferably at least about 40%, and typically greater than 100%). The turbulence increase can be provided by a substantially smooth screening medium surface at the inlet end and a contoured screening medium surface adjacent the reject end, or by first and second contoured surfaces of different aggressiveness. Contoured surfaces typically include grooves, and variables that may be changed to affect the turbulence include the depth of the grooves, the angle of inclination of the downstream wall of the grooves, the spacing between the grooves, the radius of curvature of the opening (holes or slots) edges, the frequency of openings in grooves, and the dimensions of the openings (holes or slots) in the grooves. The screen cylinder is mounted in a pressure screen housing.

26 Claims, 5 Drawing Sheets

METHOD AND APPARATUS FOR SCREENING A FIBER SUSPENSION

BACKGROUND AND SUMMARY OF THE INVENTION

The present invention relates to a method and an apparatus for screening or classifying fiber suspensions, i.e. for separating undesirable constituents, such as undesirable fiber fractions, fiber bundles, or impurities (e.g. debris and shives) from the fiber suspensions before further processing. The fractionation or screening process thereby separates the fiber suspension into an accept portion and a reject portion. The invention is particularly applicable to cellulose fiber suspensions (wood pulp) of low or medium consistencies (e.g. about 0.1–5%).

Screening of the fiber suspension is generally performed on flat screen plates or screen cylinders, disposed in a screen housing. The screen plates or screen cylinders are constructed by a screening medium, having openings (i.e. holes, which are round, or slots, which are elongated) therethrough for separating the accept and reject portions of the fiber suspension.

A typical pressure screen in the pulp processing industry comprises a screen cylinder disposed in a screen housing. A rotor, constructed for operation with hydrofoils or other pulse creating devices on a solid rotating element, is disposed coaxially with the screen cylinder within the screen housing, the rotor and the screen cylinder forming a narrow screening zone therebetween. An inlet for fiber suspension is connected to the inlet end of the feed side of the screen cylinder and a reject outlet to the reject end thereof. An accept outlet is connected to the outlet side of the screen cylinder. The inlet for fiber suspension may be connected to the inner or the outer side of the screen cylinder, the inlet side of the screen cylinder thereby being formed correspondingly on the inner or outer side of the cylinder.

The screen operates completely filled with suspension (liquid and fibers), and the fiber suspension to be screened is conveyed to the inlet end of the screen cylinder into the screening zone between the rotor and the screen cylinder. The fiber suspension is thereby transported tangentially to the feed side of the screen cylinder, the rotor increasing the circumferential velocity of the fiber suspension while the suspension passes in a screw shaped flow path along the screen cylinder toward the reject end thereof.

Accept fraction is removed from the screening zone through the openings of the screen cylinder, and reject fraction is pushed forward along the feed side of the screen cylinder toward the reject outlet. The surface of the screen cylinder, i.e. the screening medium, is kept clean and unclogged by a pulsing effect created by the hydrofoils or other similar elements on the rotor, the hydrofoils moving close to the surface of the screen cylinder. Alternatively it is possible to create a pulsing effect by having a static rotor and a rotating cylinder.

It has for some time been recognized that screening mediums have a tendency to perform rather poorly in the middle of the screening zone, and especially at the outlet or reject end of the screening zone. As the fiber suspension proceeds in a spiral flow path toward the reject end of the screening zone, the motion of the rotor induces an accelerating, circumferential speed to the fiber suspension. According to the invention it has been recognized that as the circumferential speed of the fiber suspension increases along the screen cylinder, the screening capacity-affecting static pressure decreases and is offset by an increasing dynamic pressure. It therefore seems that the flow velocity of accept fiber suspension through the openings in the screen cylinder is highest at the feed end of the cylinder and lowest at the reject end thereof.

The circumferential speed of a fiber suspension, introduced at the inlet end at e.g. a circumferential speed of about 1 m/s, is considerably increased towards the end of the screening zone, whereas the difference in speed between the fiber suspension and the rotor is decreased. A rotor having a circumferential speed of about 20–25 m/s may—toward the outlet end of the screening zone—have induced almost the same speed to the fiber suspension. Due to this decrease in relative speed between rotor and fiber suspension, fiber mat destroying pulses, which are created by the rotor, decrease toward the reject end of the screen cylinder. When pushed to its limits, a conventional screen starts to thicken (dewater) the fiber suspension at the reject end. The major reason for this is believed to be the decrease in pulses or turbulence created by the rotor as the rotational speed between the rotor and the fiber suspension decreases.

As a mat of fibers is formed on the inlet (feed) side of the screening medium, the flow of accept fiber suspension through the openings (holes or slots) is further decreased. This leads in the end to complete clogging of holes adjacent the reject end of the screen cylinder. This reject end-clogging phenomena thus effectively limits the hole or slot size which would be desirable in order to optimize cleaning efficiency.

Until the invention it has not seemed possible to decrease the dimensions of the screening openings to optimize screening conditions without simultaneously adversely affecting other screening conditions. While it has been known that different screening conditions prevail at different axial sections of the screen cylinder, e.g. at top and bottom levels of a vertical screen cylinder, it has been suggested that this be corrected by changing the rotor configuration, to increase the distance between the screening medium and the rotor towards the reject end of the screening zone, to inject dilution water into the screening zone, or to feed fiber suspension at different levels into the screening zone in order to optimize screening conditions. However until the invention no economical and successful method has been suggested for providing optimally uniform screening conditions, i.e. optimal screening capacity and cleaning efficiency, along the length of the whole surface of the screen cylinder.

The typical normal goals in screening of wood pulp are the following performance criteria:

high screening efficiency, i.e. efficient screening in which the only rejects are unwanted material (debris), with a minimum of accept fiber content in the reject portion;

high debris removal efficiency, i.e. which leads to an accept portion (flow) which is as close as possible to 100% free from unwanted material (debris) and containing only desirable fibers; and good runnability at targeted capacity, i.e. the screen operating at a reasonable pressure drop with minimal change in consistency between feed, accept and reject flows.

In general all present new screening technology seeks to attain the above goals. One key factor affecting the above goals/performance parameters is the retention time of the fiber suspension to be screened. As the fiber suspension travels through the screen, from the inlet end to the reject end, the time the debris and fibers have spent in the screen increases (the retention time increases). If the screen is run with a low rate of reject out-take, the retention time will further be increased.

Given a predetermined volume V of fiber suspension containing fibers, debris and water, one can say that the longer the retention time inside a screen the more likely will the conventional screen cylinder technology: a) Accept a larger volume of water than fiber. b) See in the accept flow an increasing population (in the volume V) of smaller but still unacceptable debris. [If the 2 or 3-dimensional size of the debris at a certain position along the screen compromises the barrier effect (that is corresponds to the size of the screen openings), the debris will also be accepted by the screen cylinder.] c) Prevent the lower reject end of the screen cylinder from doing useful screening (=good accept flow of fibers) as the fiber density becomes too high for the openings (congestion of fibers will occur in the screening apertures). And, d) increase the pressure drop (dp) as the same predetermined accept flow (capacity) will now have to pass through a smaller "open" portion of the screen cylinder. Higher pressure is required in order to increase velocities in the cylinder openings and an increasing debris population will get "pushed" through the cylinder openings into the accept side.

According to the present invention it has been recognized that the above mentioned differences call for different screening media at different axial portions of the screen in order to achieve optimal screening. It can—by analyzing the elements, i.e. fibers, debris and water in the accept portion of current screening technology—be seen that until now the accept portion has been a compromise of different distributions from various axial sections in the screen cylinder and not an optimal result of screening.

It is desirable to provide an improved average and total debris removal efficiency while at the same time providing improved screening capacity. That is, it is desirable to provide a screen cylinder, a screen, and a method of screening in which simultaneously impurities and other undesirable constituents are more efficiently prevented from flowing into the accept side, and accepts fibers are more efficiently allowed to flow through the screen openings especially in the reject end of the screen.

The present invention provides an improved screen and method of screening fiber suspensions, in which earlier discussed drawbacks are minimized. The present invention provides, especially for the pulp and paper industry, an improved screen and a method of screening cellulose fiber suspensions where screening is performed at improved hydrodynamic screening conditions. The present invention provides a screen cylinder, a screen, and a method of screening fiber suspensions with different and more efficient screening conditions in at the inlet and reject ends of the screen cylinder. And, the present invention provides a screen cylinder, a screen, and a method of screening with improved capacity and runnability of the screen, while at the same time maintaining or improving the debris removal efficiency.

The present invention provides a new non-uniform screening medium for optimized screening results, providing—in the axial direction—multisectional, or gradually, or continuously changing, screen cylinders.

Improvement in screening performance is achieved according to the invention by gradually, or in steps, changing screening characteristics through design/manufacture of the feed side contour, e.g. the feed side surface configuration or the configuration of the inlet side of the screening media openings. This accommodates optimum screening at all portions of the screen cylinder, despite different fiber suspensions and hydrodynamic conditions at its inlet and reject ends.

According to the present invention there is provided a method of screening a fiber suspension using a screening medium disposed in a screen housing having an inlet end and a reject end, the screening medium having screen openings therein with a feed side of the screening medium connected to an inlet for fiber suspension and a rejects outlet, and an outlet side of the screening medium connected to an accepts outlet, and at least a portion of the feed side being contoured. The method comprising the steps of: (a) Introducing a fiber suspension into the inlet end of the screen housing to flow into contact with the feed side of the screening medium, the openings in the screening medium allowing accepts to flow to the outlet side thereof, and causing rejects to flow to the rejects outlet. (b) Discharging rejects from the housing through the rejects outlet. (c) Discharging accepts from the housing through the accepts outlet. And, (d) by providing a different surface configuration of the screening medium feed side adjacent the reject end of the housing compared to adjacent the inlet end of the housing, increasing the turbulence of the fiber suspension at the feed side of the screening medium adjacent the reject end of the screen housing compared to the turbulence adjacent the inlet end of the screen housing to accommodate differences in flow velocity of the fiber suspension through the screening medium openings and the consistency of the fiber suspension at the reject end compared to the inlet end, to make the performance of the screening medium from the inlet end to the reject end more uniform than if the same surface configurations were provided thereat.

The improved method thus utilizes adjacent the reject end of the screening medium a feed side having a more aggressive or higher grade of fluidization inducing surface than adjacent the inlet end. The screening medium may thereby have at its reject end a contoured feed side surface and at its inlet end a smooth feed side surface. Of course adjacent both reject and inlet ends the feed side may be contoured surfaces (with grooves), with differences in turbulence achieved, for example by other differences in configuration of the contoured surfaces. For example variables that may be changed to affect the turbulence include the depth of the grooves, the angle of inclination of the downstream wall of the grooves, the spacing between the grooves, the radius of curvature of the opening edges (see "Suspensions In Process Flows", Kerekes, *CPPA Journal of Record, Technical Section, Canada*, Apr., 1994, pp. 18, 19), the frequency of openings in grooves, and the dimensions or configuration (i.e. some holes and some slots) of the screening openings in the grooves.

The invention also contemplates a screening cylinder comprising: An axis of elongation. A cylindrical feed side surface having a plurality of first screening openings provided therein. A cylindrical outlet side surface having a plurality of second screening openings therein communicating with the first screening openings. A first end of the surfaces along the axis of elongation, and a second end of the surfaces along the axis of elongation. A first surface configuration of the feed side surface having a first suspension-turbulence-inducing capability adjacent the first end. And, a second surface configuration of the feed side surface having a second suspension-turbulence-inducing capability adjacent the second end, the second capability being at least about 10% greater (and preferably at least about 40% greater, and typically more than 100% greater) than the first capability. As discussed above with respect to the method, the difference in turbulence can be achieved by varying one or more (or all) of the following parameters: the depth of the grooves, the angle of inclination of the downstream wall of the grooves, the spacing between the grooves, the radius of curvature of the opening edges, the frequency of openings in grooves, and the dimensions or configuration (i.e. some holes and some slots) of the screening openings in the grooves.

The measurement of changes in turbulence levels between a feed and reject end of a cylinder is difficult, and there are no present industry standards. The turbulence level of interest is the turbulence in the vicinity of the screen cylinder surface, and not the rotor. Comparison of turbulence levels may be by comparison of the turbulence intensity levels ($m^2/s^2$). The situation where there would be the most likely maximum difference in turbulence levels is where the inlet section of the cylinder is smooth, and the reject end is highly contoured, such as for a conventional PROFILE® screen cylinder. While there are so many variables affecting turbulence, such as outflow/inflow mode, pressure drop, tangential velocity, type of rotor, etc. which are not dependent upon the screen cylinder configurations, a rough estimate of the difference in magnitude of turbulence as a result of the surface configuration of the screening medium is:

Smooth surface about 2–4 $m^2/s^2$

PROFILE® surface about 15–30 $m^2/s^2$.

That is in this scenario the turbulence adjacent the discharge end would be more than 100% greater than adjacent the inlet end as a result of the surface configuration changes alone (independent of other factors which may ultimately play a part in the total turbulence differential).

The screen cylinder according to the invention is typically provided in combination with a pressure screen housing having an inlet end, and a reject end. The screen cylinder is mounted in the screen housing so that the first end thereof is adjacent the housing inlet end, and so that the second end thereof is adjacent the housing reject end. A rotor is provided for applying pulses to the screen cylinder, the screen cylinder and rotor being rotatably movable with respect to each other. For example the screen cylinder feed side surface is the inner surface of the cylinder, and the rotor is mounted within the cylinder and rotates while the cylinder remains stationary.

Thus according to the invention more aggressive or turbulent screening conditions are created adjacent the reject end of the screening zone. The increased turbulence affects the high concentration fiber suspension in the reject end so that the fibers are separated from each other, thereby increasing the accept fiber flow velocity through the openings in the screening medium. Also, in order to prevent debris and fiber bundles or other non-desirable constituents from flowing through the screen openings at the outlet end of the screening medium the dimensions of the openings, i.e. diameter of round holes, or width of slots, can be decreased if desired. The increased turbulence or fluidization will allow some decrease in dimensions without the screening capacity being decreased to a negative extent.

In some pulp screens alternating grooves and ridges are provided by e.g. machining on the inlet side of the screening medium for adjusting the flow characteristics of the pulp passing through the screen. The direction of the grooves is preferably transverse to the direction of the flow of fiber suspension. In PROFILE® contoured screen cylinders, such as shown in U.S. Pat. No. 4,529,520 (the disclosure of which is hereby incorporated by reference herein), the upstream side plane of the grooves is at one angle (e.g. substantially perpendicular, e.g. about 85°–120°) to the envelope surface of the screening medium, whereas the downstream side plane of the grooves is inclined at another angle (e.g. forming a 60°–5° angle with the envelope surface). The screening openings are formed in (adjacent or completely within) the bottom portions of the grooves. The PROFILE® contoured screen cylinders with specifically shaped grooves induces high-intensity turbulence at the screening openings (holes or slots), and decreases the resistance to fluid flow through the screening medium, i.e. provides a smooth flow of accept fiber suspension through the screening medium. Thus a PROFILE® screen cylinder can run at higher consistencies, lower pressure drop, and with less fractionation of long fibers.

In constructing a PROFILE® screen cylinder, a small tilted angle from ninety degrees for the upstream side plane of the groove (e.g. up to about a +30 degree tilt) helps to induce a higher flow intensity toward the aperture, however at the cost of lower debris removal efficiency. The balance between capacity and accepts cleanliness can then be handled by changing slightly the angle or the aperture size. In any event, when viewing any particular groove of such cylinders from a perpendicular position above the surface, the upstream side plane appears to clearly closer to a perpendicular surface (even when tilted, eg. up to about thirty degrees) than the downstream inclined plane.

According to a preferred embodiment of the invention, when utilizing the above described PROFILE® screen cylinder, the grooves at the reject end of the screening medium may be about 0.2 to 2 mm, preferably 0.3 to 1.2 mm, deeper than the grooves adjacent the inlet end thereof in order to induce an increased (by at least about 10%, preferably at least about 40%, typically more than 100%) turbulence in the vicinity of the screen surface adjacent the reject end.

According to another preferred embodiment of the invention a difference in turbulence induced by the grooved contour configuration can be achieved by varying the steepness of the side walls of the grooves. The steeper the downstream side wall of the grooves or the smaller the angle between the upstream and downstream side walls the more turbulence will be induced on the fiber suspension at the screening openings. Of course all factors of the contour configuration cooperate, so that the effect of some changes in configuration may override others. If e.g. the grooves at the reject end are much deeper than the grooves at the inlet end, then it may be possible, if for some reason desired, to use grooves with less inclined downstream side walls at the reject end than at the inlet end and still achieve sufficient turbulence at the reject end.

The present invention provides, according to still another preferred embodiment thereof, the possibility to use different hole or slot sizes, or different types of holes or slots, adjacent the inlet and reject ends of the screening medium. The probability of debris being accepted by the screen increases towards the reject end of the screening medium, as the concentration of debris increases. Also a longer retention time increases the probability of debris being accepted. It may be desirable to use smaller holes or slots, adjacent the reject end in order to increase the barrier effect of the screen and compensate for the increased tendency of debris to flow through openings. Increased turbulence at the reject end, for increasing screening capacity, also prevents clogging of the smaller openings. Slot size (or round hole diameter) may vary so that slots in the reject end are about 10–100+% (preferably about 20–50%) narrower than those in the inlet end. For example slot size may in a slotted screen plate thereby vary e.g. between about 0.1–0.5 mm, e.g. between about 0.1–0.2 mm, at the reject end, and about 0.35–0.5 mm at the inlet end.

It may also be possible to achieve different screening conditions by having different types of openings in the screening medium at the inlet end of the screen than at the reject end of the screen, i.e. round holes at the feed end and slots at the reject end.

It may be desirable to adjust spacing between grooves and/or openings in contoured surfaces or spacing between openings in smooth surfaces or the width of the bottom of grooves in accordance with changed screening conditions. For example by providing a spacing adjacent the reject end at least about 10% greater than at the inlet end a significant difference in turbulence can be achieved. That is adjacent the inlet end about 7–9 grooves per inch (e.g. 8) are provided, while adjacent the reject end about 5–7 (e.g. 6) grooves per inch, and at least about one groove per inch less, are provided.

It is appreciated that the invention may be employed with screening cylinders in which the fiber suspension flows from inside the cylinder to the outside as well as in screening cylinders in which the fiber suspension flows from the outside into the cylinder.

The invention may be employed with screen cylinders made by bending or forming screen plates having grooves provided by machining into the plates, or by welding bars or similar surface elevations onto the surfaces thereof. The present invention may also be employed with screening cylinders made of parallel rods with slots therebetween, or screening cylinders with cylindrical wedge wire sections. Turbulence of the reject end of the screening medium may be increased by welding contour increasing elements on the surface of the screening medium.

The present invention provides a screening technology according to which it is possible to change the screening characteristics gradually by changing, e.g. the screen contour parameters gradually, not only in two steps but if desired in several steps (e.g. 3, 4, or more steps) or essentially continuously (e.g. from groove to groove), for maintaining optimum hydrodynamic/screening conditions at any axial section of the screening device. Also the screening openings in grooved screen plates may be provided in different patterns; for example one row of openings in some grooves, zero or two rows of openings in the adjacent grooves, etc.

The invention provides optimized screening concepts preventing high concentration fiber layers from being formed on the screening medium at the reject end, thereby leading to a more uniform accept flow through the screening medium and a more uniform and higher capacity distribution over the screen cylinder. The invention especially makes it possible to operate screens at higher consistencies and debris concentrate levels, without sacrificing debris removal efficiency.

The present invention provides a substantial improvement in screening with both contoured (e.g. grooved) screen cylinders, and conventional smooth screen cylinders, and provides potential improvements in capacity and cleanliness, also at lower reject rates.

In summary, it may be the that more efficient debris removal may be maintained by utilizing smaller screen openings adjacent the reject end of the screening medium, while capacity at the same time is maintained or even increased by inducing higher turbulence or fluidization adjacent that end. The decreased size of openings is compensated for by the increased turbulence or fluidization.

The present invention seeks to provide in one single screen or screen cylinder low concentration screening conditions adjacent the inlet end and high concentration screening conditions adjacent the reject end. It seeks to make it possible in many processes to achieve the same screening result, and same screening capacity at maintained cleaning efficiency, with one single screen or screen cylinder as with two separate primary and secondary conventional screens or screen cylinders, the first with low debris concentration and the other with high debris concentration, having conventional uniform screen cylinders.

The invention will be described in more detail in the following with the reference to the accompanying drawings.

DETAILED DESCRIPTION OF THE DRAWINGS

Figure 1:
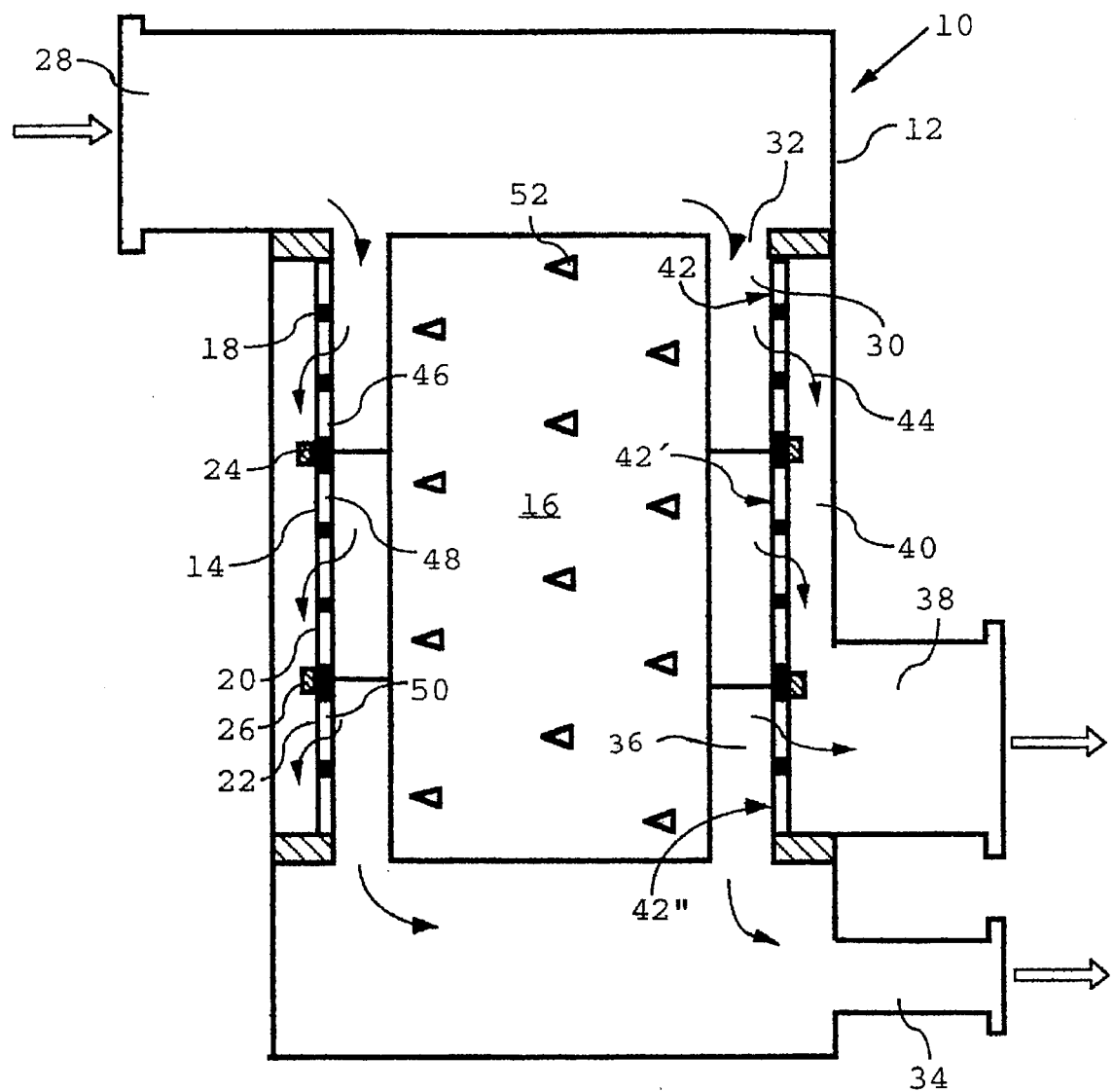
FIG. 1 is a schematic vertical cross-sectional view of a screen housing with a screen cylinder with different screening sections constructed in accordance with the present invention.

FIG. 1 illustrates a screen 10 formed in accordance with the present invention and preferably useful for screening generally low or medium consistency (e.g. about 0.1–5%) cellulose pulp. The screen 10 includes a screen housing 12 having a screen cylinder 14 and a rotor 16 disposed coaxially therein. The screen cylinder 14 is made of three cylindrical screen sections/plates (or cylindrical wedge wire sections) 18, 20, 22 disposed coaxially one atop the other and connected by circular elements 24 and 26, the screen plates being curved into the illustrated cylindrical configuration and forming a screening medium. The cylinder screen sections 18, 20, 22 may be separately constructed, and bolted together, such as shown in U.S. Pat. No. 4,986,900 (the disclosure of which is hereby incorporated by reference herein) so that the sections subject to more frequent wear could be replaced, or so that the turbulence differential characteristics could be changed. The sections may be made of ceramic material, although normally the entire cylinder 14 is of metal.

The screen housing 12 is provided with an inlet 28 for pulp, fiber suspension, or other slurry to be screened at the top of the screen housing 12. Fiber suspension is fed into the upper or inlet end 30 of an annular screening zone 32 formed between the screen cylinder 14 and the rotor 16. The fiber suspension is thereby introduced tangentially towards the screen plate 14. An outlet 34 for rejects is provided at the bottom of the screen housing 12 and connected to the reject end 36 of the annular screening zone 32. An accepts outlet 38 is connected to the outer annular space 40 formed between the screen cylinder 14 and the screen housing 12 on the accepts side of the screen cylinder 14.

Fiber suspension flows through the inlet 28 and is introduced tangentially onto the inner feed side 42 of the screen plate 18. An accept fiber suspension flow 44 is forced by pressure to flow through the screen sections/plates 18, 20 and 22, i.e. through openings (e.g. vertical slots) 46, 48 and 50 (best seen in FIGS. 2 to 4) provided therein. Reject fibers, sticks, fiber bundles, debris and other impurities are prevented from flowing through the openings 46, 48, 50 and are forced to flow downwardly along the inner side of the screen cylinder 14, past the screen sections 20 and 22 towards the reject outlet 34.

Blades 52 of the rotor 16 force the fiber suspension to move along the screen cylinder 14. The blades 52 also induce cleaning pulses in the fiber suspension at the openings 46, 48 and 50, preventing fibers from getting stuck in the openings.

Figure 2:
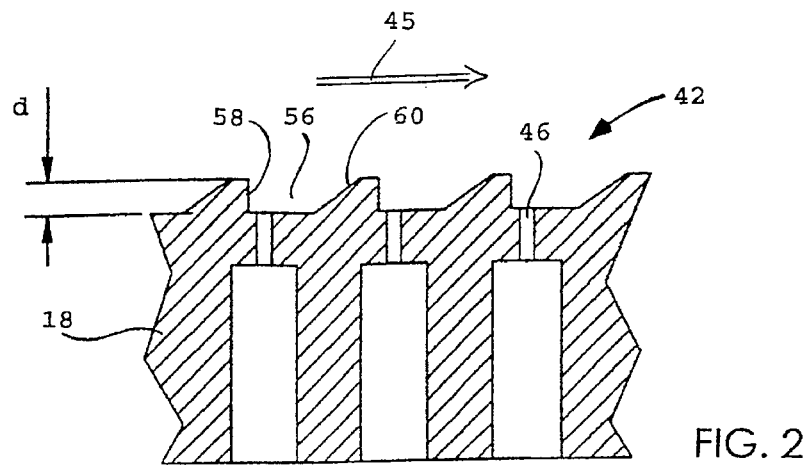
FIGS. 2 to 4 are enlarged horizontal cross sectional views of the three screen surfaces shown in FIG. 1.
Figure 3:
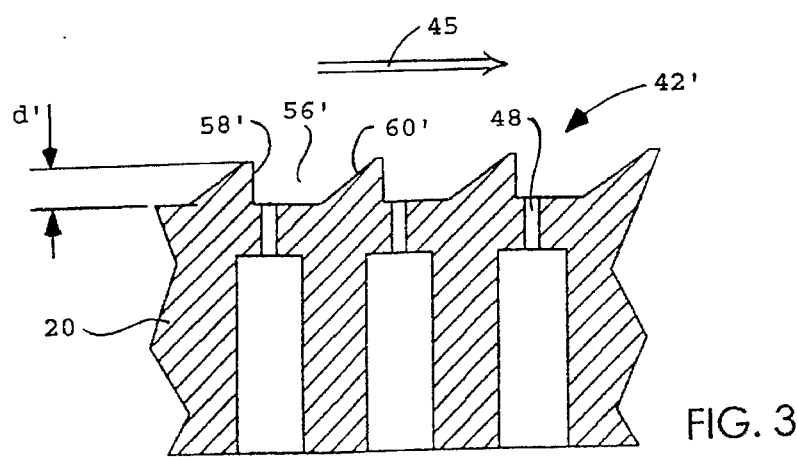
Figure 4:
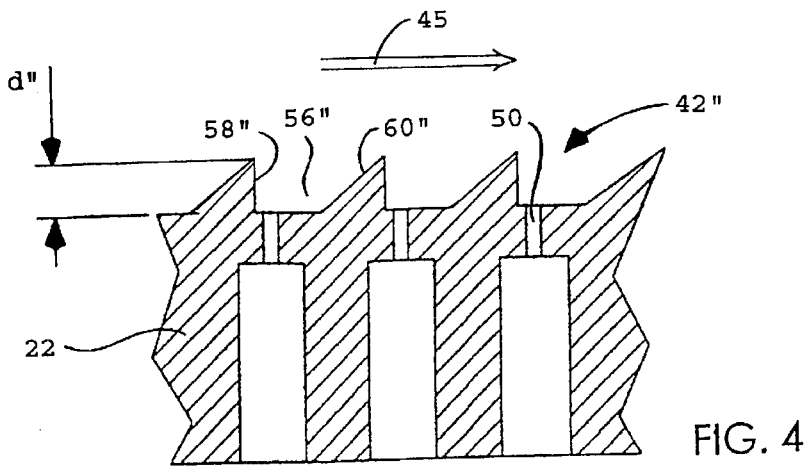

The inner feed side surface sections 42, 42' and 42" of the screen cylinder 14 forming the screening medium has—according to the invention—different configurations at the inlet end 30 (screen section 18), middle section 20, and reject end 36 (screen section 22). FIGS. 2, 3 and 4 show enlarged horizontal cross sectional views through screen plates/sections 18, 20 and 22, having different feed side configurations 42, 42' and 42". [Reference to feed side configurations of screen plates also encompass the feed side configurations of cylindrical wedge wire sections.] All screen plates have a contoured configuration at the feed sides. In a contoured feed side surface screening openings 46, 48, 50 open into grooves 56, 56', and 56" and are shown as substantially perpendicular to the flow of fiber suspension (arrow 45) along the screen plates. The grooves 56, 56', and 56" may have—as illustrated—substantially perpendicular upstream side walls 58, 58', and 58" (e.g. making an angle of about 85°–115° to the flow 45), and markedly inclined downstream side walls 60, 60', and 60".

The depths d, d', and d" of the grooves 56, 56', 56" vary in the different screen plates/sections 18, 20 and 22. Preferably the feed end screen section/plate 18 has the shallowest groove 56, and the reject end screen section/plate 22 has the deepest groove 56", d<d'<d". The deeper the groove, the higher degree of turbulence that is induced into the fiber suspension flowing through the screening zone having that particular groove depth. For example the depth d" is about 0.2–2.0 (preferably 0.3–1.2) mm greater than depth d', with depth d' about halfway between d and d" (e.g. 0.1–1.0 mm greater than d). In this way the turbulence induced by grooves 56" is at least 10% greater (preferably at least 40% greater) than that induced by grooves 56. Only a very small difference in depth may be needed if other differences are also employed (e.g. differences in spacing of grooves, or adding turbulence-inducing obstacles).

The configuration of the PROFILE® commercial cylinder (see U.S. Pat. No. 4,529,520), or equivalents thereto (equivalents being shown in U.S. Pat. Nos. 4,950,402, 5,000,842, 4,880,540, and 5,073,254, among others, and in PCT published application WO 91/05911 published May 2, 1991, Chinese Patent ZL 92 2 20840.9, and Japanese published patent application no. Hei 2-264092 published Oct. 26, 1990, the disclosures of which are hereby incorporated by reference herein), are preferred. However other configurations can also be employed. For example the contour provided by the undulating (wavy) screen plate of U.S. Pat. No. 2,827,169 to Cusi may be utilized.

Figure 5:
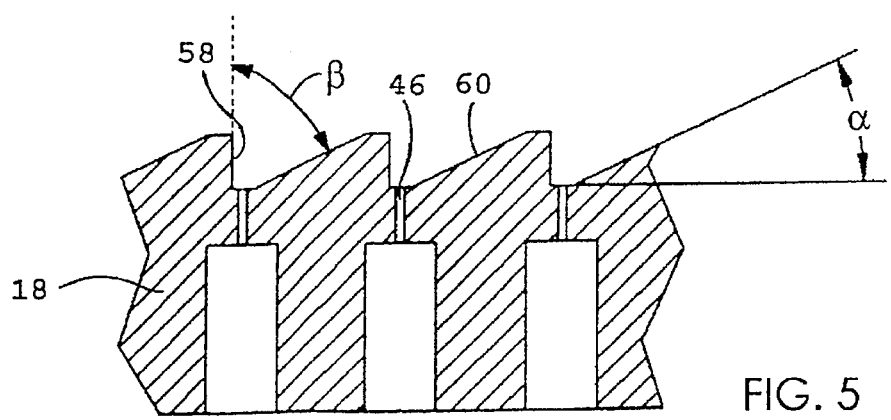
FIGS. 5 to 7 are enlarged horizontal cross sectional views corresponding to FIGS. 2 to 4 of another embodiment of screen cylinder according to the invention.
Figure 6:
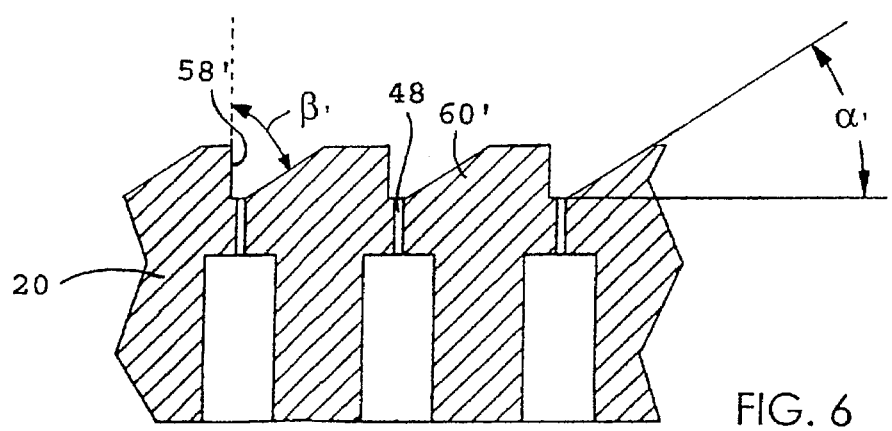
Figure 7:
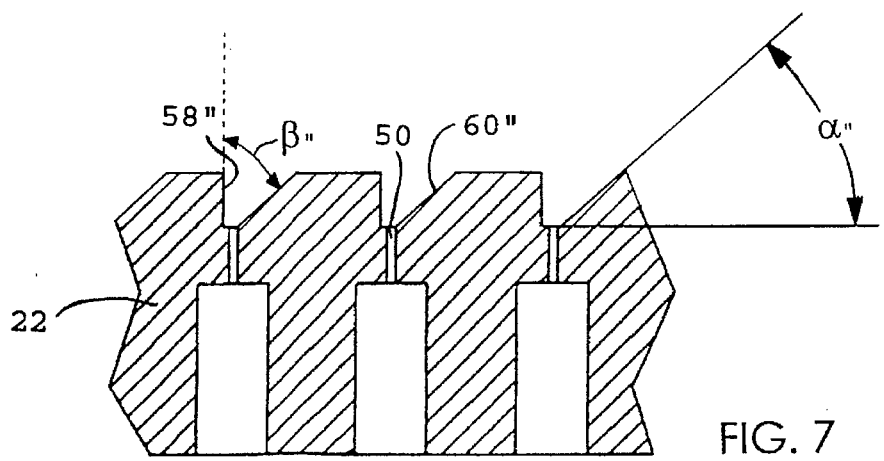

FIGS. 5 to 7 show another variance in groove configuration in which the angle $\alpha$, $\alpha'$ and $\alpha''$ of inclination of the downstream side wall 60, 60', 60" of each groove is larger adjacent the reject end screen section/plate 22 than at the middle and the inlet end screen sections/plates 20 and 18; i.e. $\alpha < \alpha' < \alpha''$. The angle $\alpha''$ may in some cases be essentially perpendicular to the envelope surface of the screen plate. Normally, however, angle $\alpha$ is about 10°–30°, angle $\alpha'$ about 20°–40° (and greater than angle $\alpha$ by at least about 5°–10°), and angle $\alpha''$ is about 30°–50° (and greater than angle $\alpha'$ by at least about 5°–10°). Simultaneously the angle $\beta$, $\beta'$, $\alpha''$ between the upstream side wall 58, 58', 58" and the downstream side wall 60, 60', 60" of each groove varies, decreasing from adjacent the inlet end screen section/plate 18 toward the reject end screen section/plate 22. A groove with a steeper downstream side wall 60, 60', 60" gives a more aggressive fluidization of fiber suspension at the reject end. Smaller screening apertures or openings 50 can be used in the reject end screen section/plate 22 (compared to the size of opening 46) to prevent debris flow through the screening medium.

Figure 8:
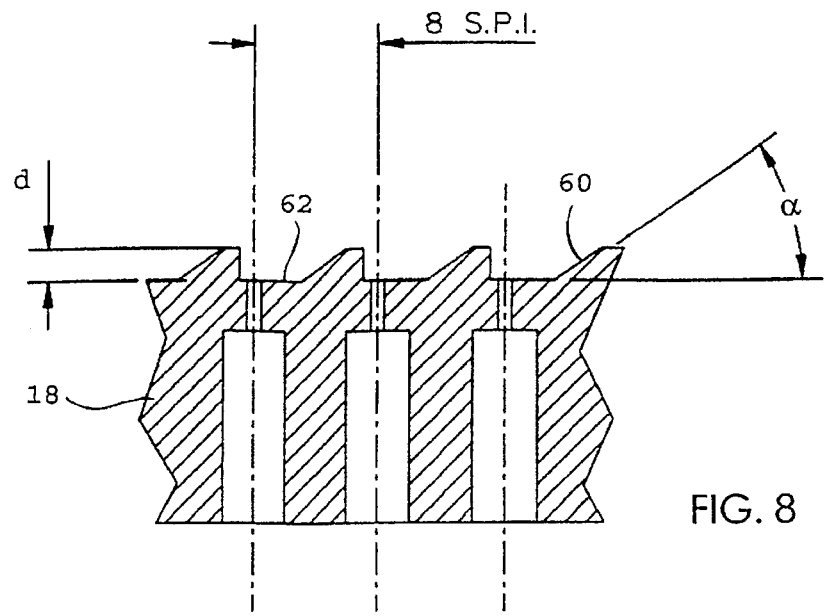
FIGS. 8 to 10 are enlarged horizontal cross sectional views corresponding to FIGS. 2 to 4 of still another embodiment of screen cylinder according to the invention.
Figure 9:
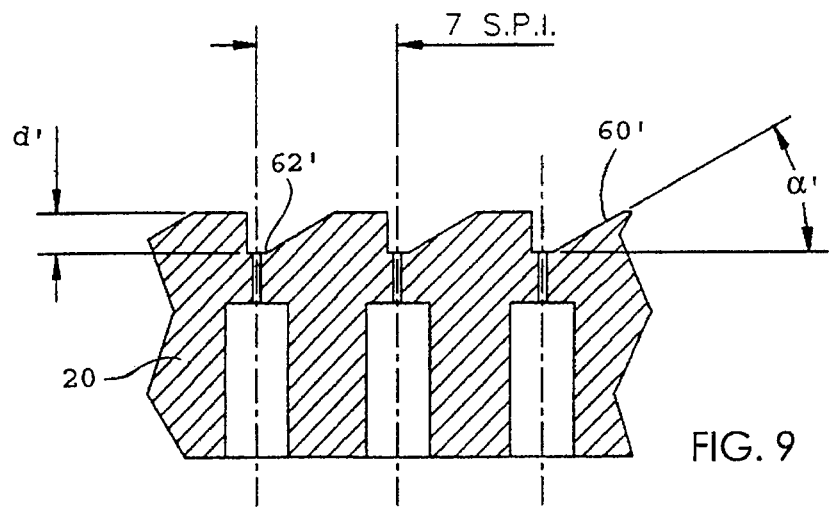
Figure 10:
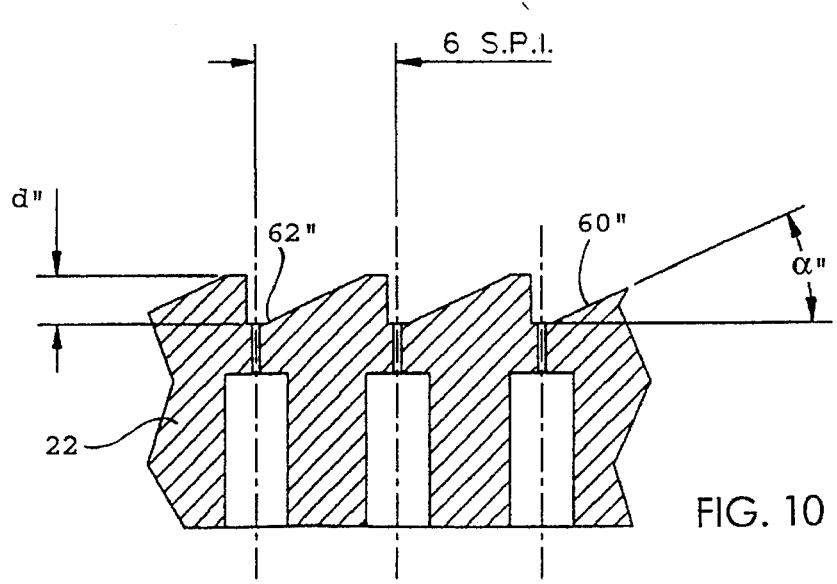

FIGS. 8 to 10 show a preferred combination of contoured screen sections/plates 18, 20 and 22 in which the groove (depression) depth d, d' and d" is increased from 0.8 mm at section 18, to 1.0 mm in the middle part (20) and further to 1.2 mm in the reject end section 22 of the screen cylinder 14, for increasing turbulence. The angle $\alpha$, $\alpha'$ and $\alpha''$ referring to the inclination of the downstream side walls 60, 60' and 60" of the groove is decreased from 35° to 25°, the width of the bottom 62, 62' and 62" of the groove is decreased and the spacing of the grooves is increased (preferably at least about 10%), e.g. from about 7–9 (e.g. 8) grooves per inch to about 5–7 (e.g. 6) grooves per inch from the inlet end towards the reject end of the screen cylinder 14, in order to achieve optimal hydrodynamic conditions. The width of the screen openings (particularly if slots) may simultaneously be decreased about 20–50%, or more, e.g. from 0.35 mm to 0.15 mm, in order to prevent rejected fibers or debris from flowing through the screening medium.

Figure 11:
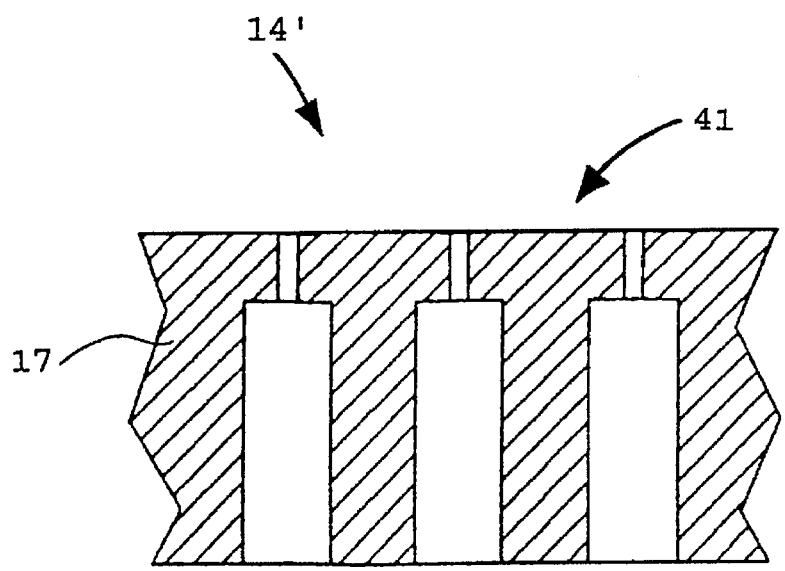
FIGS. 11 and 12 are enlarged horizontal cross sectional views corresponding to FIGS. 2 to 4 of a still further screen cylinder according to the invention, having only two different screen surfaces.
Figure 12:
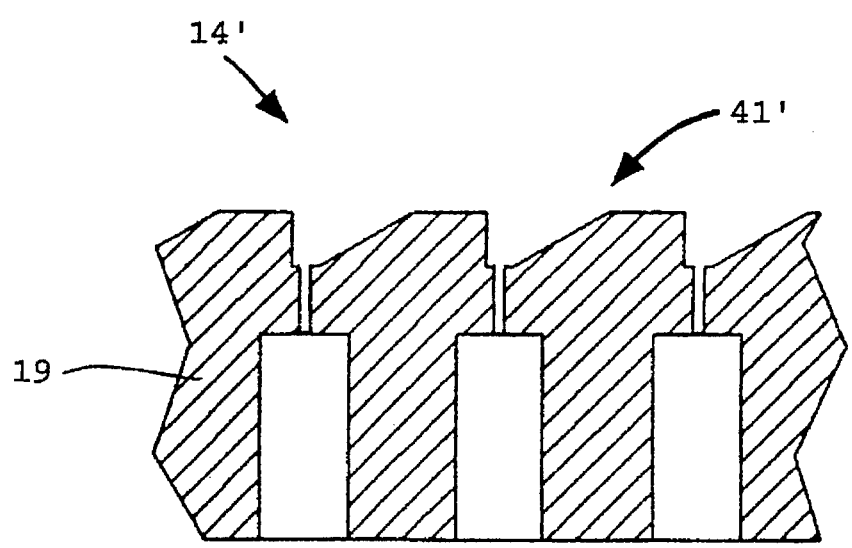

FIGS. 11 and 12 refer to still another screen cylinder 14' according to the present invention, the screen cylinder 14' including two different screen sections/plates, an inlet end screen plate/section (FIG. 11) with a substantially smooth feed side surface 41, and a contoured reject end screen plate/section (FIG. 12) with a contoured feed side surface 41".

Slot size (or round hole diameter) (e.g. 46, 48, 50 in FIGS. 2–4) may vary so that slots in the reject end are about 10–100+% (preferably about 20–50%) narrower than those in the inlet end. For example slot size may in a slotted screen plate thereby vary e.g. between about 0.1–0.5 mm, e.g. between about 0.1–0.2 mm, at the reject end, and about 0.35–0.5 mm at the inlet end. It is also possible according to the invention to combine different types of screening openings. Round openings with a funnel like inlet for smooth flow may be used in the upper inlet part 18 of a screen cylinder 14, whereas a grooved turbulence creating configuration with narrow slots may be used adjacent the reject end 20 of the screen cylinder 14. The width of each of the slots is considerably smaller than the diameter of each of the round holes; for example at the reject section 20 the width of the slots (50) would be only 10–20% of the diameter of the holes (46) at the inlet section 18.

Regardless of the exact surface configuration parameters selected, according to the present invention the differences in surface configuration of the screen cylinder 14 between adjacent the inlet 28 and adjacent the outlet 34 result in an increase in turbulence at the screen cylinder surface that is at least about 10%, preferably greater than 40%, and typically over 100%. For the maximum differential situation, the turbulence at the screen cylinder surface due to the screen cylinder surface configuration could vary from about 2–4 $m^2/s^2$ adjacent inlet 28 (e.g. a smooth cylinder), to about 15–30 $m^2/s^2$ adjacent outlet 34 (e.g. a highly contoured cylinder), i.e. a factor of about 3.75 to 1, to about 15 to 1.

Additional turbulence may be achieved by various rotor configurations and other elements in the screening zone 32.

The present invention may also be utilized in screens with horizontally disposed screen cylinders, or with flat screen plates. The invention may also be used in screens having screen cylinders where accept flow is from the outside of the screen cylinder towards the inside, as well as in screens having double screen cylinders disposed coaxially within each other. Turbulence creating grooves or flow obstacles in the outlet end of the screen cylinder may have two or more slots or round holes after each other in the bottom thereof, or there may be no holes or slots in the grooves which create turbulence.

While the invention has been described in connection with what is presently considered to be the most practical and preferred embodiment, it is to be understood that the invention is not to be limited to the disclosed embodiments, but on the contrary is intended to cover various modifications and equivalent arrangements included within the spirit and scope of the appended claims.

What is claimed is:

1. A screen cylinder for screening fiber suspensions, comprising:
   an axis of elongation;
   a cylindrical feed side surface having a plurality of first screening openings provided therein;
   a cylindrical outlet side surface having a plurality of second screening openings therein communicating with said first screening openings;
   a first end of said surfaces along said axis of elongation, and a second end of said surfaces along said axis of elongation;
   a first surface configuration of said feed side surface having a first suspension-turbulence-inducing capability in the vicinity of said feed side surface adjacent said first end and comprising a substantially smooth feed side surface; and
   a second surface configuration of said feed side surface having a second suspension-turbulence-inducing capability in the vicinity of said feed side surface adjacent said second end, said second capability inducing at least about 10% greater turbulence than said first capability and comprising a contoured feed side surface.

2. A screen cylinder as recited in claim 1 further comprising at least one additional contour of said feed side surface between said first and second surface configurations, said at least one additional contour having a third suspension-turbulence inducing capability between that of said first and second surface configurations.

3. A screen cylinder as recited in claim 1 wherein the configuration of said feed side surface gradually changes from said first surface configuration to said second surface configuration.

4. A screen cylinder for screening fiber suspensions, comprising:
   an axis of elongation;
   a cylindrical feed side surface having a plurality of first screening openings provided therein;
   a cylindrical outlet side surface having a plurality of second screening openings therein communicating with said first screening openings;
   a first end of said surfaces along said axis of elongation, and a second end of said surfaces along said axis of elongation;
   a first contour of said feed side surface adjacent said first end and including grooves having a first depth, said first screening openings adjacent bottom portions of said grooves having a first depth; and
   a second contour of said feed side surface adjacent said second end and including grooves having a second depth, said first screen openings adjacent bottom portions of said grooves having a second depth, said second depth being between about 0.2–2.0 mm greater than said first depth.

5. A screen cylinder as recited in claim 4 further comprising at least one additional contour of said feed side surface between said first and second ends and including grooves having a third depth, said first screening openings adjacent bottom portions of said grooves, said third depth being intermediate said first and second depths.

6. A screen cylinder as recited in claim 4 in combination with a pressure screen housing having an inlet end, and a reject end; said screen cylinder mounted in said screen housing so that said first end thereof is adjacent said housing inlet end, and so that said second end thereof is adjacent said housing reject end; and a rotor for applying pulses to said screen cylinder, said screen cylinder and rotor being rotatably movable with respect to each other.

7. A screen cylinder as recited in claim 4 wherein said second depth is between about 0.3–1.2 mm greater than said first depth.

8. A screen cylinder as recited in claim 4 wherein said grooves of each of said first and second contours include contour and surface manifestations defined by: an upstream wall substantially perpendicular to the flow direction of suspension; a depression located closer to said outlet side surface than said upstream wall; and a downstream wall extending gradually from said depression toward said upstream wall of the next groove at an angle $\alpha$; any angle of tilt of said upstream wall being much less, when viewed from a position perpendicular to and above said inlet side surface, being clearly closer to a perpendicular than said downstream wall; said first screen openings extending from said depression to said outlet side surface; and wherein said first contour angle $\alpha$ is greater than said second contour angle $\alpha$.

9. A screen cylinder as recited in claim 8 wherein said first contour grooves have a first number of grooves per inch, and said second contour grooves have a second number of grooves per inch; and wherein said second number of grooves per inch is less than said first number of grooves per inch.

10. A screen cylinder as recited in claim 9 wherein said first number of grooves per inch is about 7–9, and wherein said second number of grooves per inch is about 5–7, said second number being at least about one groove per inch less than said first number.

11. A screen cylinder for screening fiber suspensions, comprising:
    an axis of elongation;
    a cylindrical feed side surface having a plurality of first screening openings provided therein;
    a cylindrical outlet side surface having a plurality of second screening openings therein communicating with said first screening openings;
    a first end of said surfaces along said axis of elongation, and a second end of said surfaces along said axis of elongation;
    a first contour of said feed side surface adjacent said first end and including grooves having a first contour and surface manifestations defined by an upstream wall substantially perpendicular to the flow direction of suspension, a depression located closer to said outlet side surface than said upstream wall, and a downstream wall extending gradually from said depression toward said upstream wall of the next groove at an angle α, said first screening openings extending from said depressions to said outlet side surface; and a second contour of said feed side surface adjacent said second end and including grooves having a second contour and surface manifestations defined by an upstream wall substantially perpendicular to the flow direction of suspension, a depression located closer to said outlet side surface than said upstream wall, and a downstream wall extending gradually from said depression toward said upstream wall of the next groove at an angle α", said first screening openings extending from said depressions to said outlet side surface; and wherein angle α" is at least about ten degrees greater than angle α.

12. A screen cylinder as recited in claim 11 in combination with a pressure screen housing having an inlet end, and a reject end; said screen cylinder mounted in said screen housing so that said first end thereof is adjacent said housing inlet end, and so that said second end thereof is adjacent said housing reject end; and a rotor for applying pulses to said screen cylinder, said screen cylinder and rotor being rotatably movable with respect to each other.

13. A screen cylinder as recited in claim 11 wherein said first contour grooves have a first number of grooves per inch, and said second contour grooves have a second number of grooves per inch; and wherein said second number of grooves per inch is less than said first number of grooves per inch.

14. A screen cylinder as recited in claim 11 wherein said first number of grooves per inch is about 7–9, and wherein said second number of grooves per inch is about 5–7, said second number being at least about one groove per inch less than said first number.

15. A screen cylinder as recited in claim 11 further comprising at least one additional contour of said feed side surface between said first and second ends and including grooves having an angle α', said angle α' is at about 5° greater than angle α and at least about 5° less than angle α".

16. A screen cylinder for screening fiber suspensions, comprising:

an axis of elongation;

a cylindrical feed side surface having a plurality of first screening openings provided therein;

a cylindrical outlet side surface having a plurality of second screening openings therein communicating with said first screening openings;

a first end of said surfaces along said axis of elongation, and a second end of said surfaces along said axis of elongation;

a first contour of said feed side surface adjacent said first end and including grooves having said first screening openings therein of a first width or diameter; and a second contour of said feed side surface adjacent said second end and including grooves having said first screening openings therein having a second width or diameter; and wherein said second width or diameter is at least about 20% smaller than said first width or diameter, said second contour of said feed side surface including means to induce at least 10% greater turbulence than said first contour of said feed side surface.

17. A screen cylinder as recited in claim 16 wherein said openings are slots and wherein said second width is about 20–50% narrower than said first width.

18. A screen cylinder as recited in claim 16 in combination with a pressure screen housing having an inlet end, and a reject end; said screen cylinder mounted in said screen housing so that said first end thereof is adjacent said housing inlet end, and so that said second end thereof is adjacent said housing reject end; and a rotor for applying pulses to said screen cylinder, said screen cylinder and rotor being rotatably movable with respect to each other.

19. A screen cylinder as recited in claim 16 wherein holes having said first diameter are provided as said screen openings of said first end, and wherein slots having a width about 10–20% of said first diameter are provided as said second width as said screen openings of said second end.

20. A screen cylinder for screening fiber suspensions, comprising:

an axis of elongation;

a cylindrical feed side surface having a plurality of first screening openings provided therein;

a cylindrical outlet side surface having a plurality of second screening openings therein communicating with said first screening openings;

a first end of said surfaces along said axis of elongation, and a second end of said surfaces along said axis of elongation;

a first surface configuration of said feed side surface having a first suspension-turbulence-inducing capability in the vicinity of said feed side surface adjacent said first end and comprising a first contour surface configuration; and a second surface configuration of said feed side surface having a second suspension-turbulence-inducing capability in the vicinity of said feed side surface adjacent said second end, said second capability being at least about 10% greater than said first capability and comprising a second contour surface configuration.

21. A screen cylinder as recited in claim 20 further comprising at least one additional contour of said feed side surface between said first and second surface configurations, said at least one additional contour having a third suspension-turbulence inducing capability between that of said first and second surface configurations.

22. A screen cylinder for screening fiber suspensions, comprising:

an axis of elongation;

a cylindrical feed side surface having a plurality of first screening openings provided therein;

a cylindrical outlet side surface having a plurality of second screening openings therein communicating with said first screening openings;

a first end of said surfaces along said axis of elongation, and a second end of said surfaces along said axis of elongation;

a first surface configuration of said feed side surface having a first suspension-turbulence-inducing capability in the vicinity of said feed side surface adjacent said first end; and a second surface configuration of said feed side surface having a second suspension-turbulence-inducing capability in the vicinity of said feed side surface adjacent said second end, said second capability being at least about 10% greater than said first capability;

said screen cylinder in combination with a pressure screen housing having an inlet end, and a reject end; said screen cylinder mounted in said screen housing so that said first end thereof is adjacent said housing inlet end, and so that said second end thereof is adjacent said housing reject end; and a rotor for applying pulses to said screen cylinder, said screen cylinder and rotor being rotatably movable with respect to each other.

23. A screen cylinder as recited in claim 22 wherein said screening openings are round holes, and wherein said screen cylinder feed side surface is an inner surface of said cylinder, and wherein said rotor is mounted within said cylinder and rotates while said cylinder remains stationary.

24. A screen cylinder for screening fiber suspensions, comprising:

an axis of elongation;

a cylindrical feed side surface having a plurality of first screening openings provided therein;

a cylindrical outlet side surface having a plurality of second screening openings therein communicating with said first screening openings;

a first end of said surfaces along said axis of elongation, and a second end of said surfaces along said axis of elongation;

a first surface configuration of said feed side surface having a first suspension-turbulence-inducing capability in the vicinity of said feed side surface adjacent said first end; and a second surface configuration of said feed side surface having a second suspension-turbulence-inducing capability in the vicinity of said feed side surface adjacent said second end, said second capability being at least about 10% greater than said first capability; and wherein the configuration of said feed side surface gradually changes from said first surface configuration to said second surface configuration.

25. A screen cylinder for screening fiber suspensions, comprising:

an axis of elongation;

a cylindrical feed side surface having a plurality of first screening openings provided therein;

a cylindrical outlet side surface having a plurality of second screening openings therein communicating with said first screening openings;

a first end of said surfaces along said axis of elongation, and a second end of said surfaces along said axis of elongation;

a first surface configuration of said feed side surface having a first suspension-turbulence-inducing capability in the vicinity of said feed side surface adjacent said first end; and a second surface configuration of said feed side surface having a second suspension-turbulence-inducing capability in the vicinity of said feed side surface adjacent said second end, said second capability being at least about 10% greater than said first capability; and wherein said feed side surface has a surface configuration which changes in steps from said first surface configuration to said second surface configuration, and wherein said second capability is at least 100% greater than said first capability.

26. A screen cylinder as recited in claim 25 further comprising at least a third surface configuration between said first and second surface configurations, said third surface configuration having a third suspension-turbulence inducing capability that is intermediate said first and second suspension-turbulence-inducing capabilities.

* * * * *